US006448199B1

(12) United States Patent
Choudhary et al.

(10) Patent No.: US 6,448,199 B1
(45) Date of Patent: Sep. 10, 2002

(54) HYDROPHOBIC COMPOSITE PD-MEMBRANE CATALYST USEFUL FOR NON-HAZARDOUS DIRECT OXIDATION OF HYDROGEN BY OXYGEN TO HYDROGEN PEROXIDE AND METHOD OF ITS PREPARATION

(75) Inventors: Vasant Ramchandra Choudhary; Subhash Dwarkanath Sansare; Abaji Govind Gaikwad, all of Pune (IN)

(73) Assignee: Council of Scientific & Industrial Research (IN)

( * ) Notice: Subject to any disclaimer, the term of this patent is extended or adjusted under 35 U.S.C. 154(b) by 86 days.

(21) Appl. No.: 09/655,978

(22) Filed: Sep. 5, 2000

(51) Int. Cl.[7] .......................... B01J 23/42; B01J 23/44; B01J 20/28

(52) U.S. Cl. ............................ 502/339; 502/4; 502/333

(58) Field of Search ............................ 502/4, 339, 333

(56) References Cited

U.S. PATENT DOCUMENTS

| | | | | | |
|---|---|---|---|---|---|
| 4,066,823 | A | * | 1/1978 | Armstrong | 429/41 |
| 4,393,038 | A | | 7/1983 | Sun et al. | |
| 4,699,892 | A | * | 10/1987 | Suzuki | 502/4 |
| 4,832,938 | A | | 5/1989 | Gosser et al. | |
| 5,169,618 | A | | 12/1992 | Maraschino | |
| 5,399,334 | A | | 3/1995 | Kawakami et al. | |
| 5,932,361 | A | * | 8/1999 | Belyakov et al. | 428/688 |
| 6,033,632 | A | * | 3/2000 | Schwartz et al. | 422/190 |
| 6,066,592 | A | * | 5/2000 | Kawae et al. | 502/439 |

FOREIGN PATENT DOCUMENTS

| | | | |
|---|---|---|---|
| DE | 4127918 | A1 | 10/1992 |
| EP | 0504741 | A1 | 9/1992 |
| EP | 0621235 | A1 | 10/1994 |
| JP | 001133909 | | 5/1989 |
| JP | WO94/12428 | | 6/1994 |
| WO | WO93/14025 | | 7/1993 |

OTHER PUBLICATIONS

L. Fu et al., Stud. Surf. Sci. Catal., 72 (1992) 33–41.
S. Umiya et al., Journal of Membrane Science, vol. 56, pp. 303–313; 315–325 (1991).

* cited by examiner

*Primary Examiner*—Steven P. Griffin
*Assistant Examiner*—Cam N. Nguyen
(74) *Attorney, Agent, or Firm*—Samuels, Gauthier & Stevens

(57) ABSTRACT

A hydrophobic composite Pd-membrane catalyst, useful for the non-hazardous direct oxidation of hydrogen by oxygen to hydrogen peroxide, without a gas phase mixing of hydrogen and oxygen or air, having the general formula: HPM (c)/SOMF (b)/$M_xPd_{1-x}$ (a)/IPM wherein, IPM is an inorganic porous membrane, $M_xPd_{1-x}$ is a metal alloy, permeable only to hydrogen gas, Pd is a palladium metal; M is a metal other than palladium, or a mixture of two or more thereof; x is a mole fraction of the metal M in the metal alloy ($M_xPd_{1-x}$), a, in the round bracket, is a weight of the metal alloy per unit area of IPM; SOMF is a surface oxidized thin metal film comprising palladium b, in the round bracket, is a thickness of SOMF; HPM is a hydrophobic polymer membrane and c, in the round bracket , is a weight of the HPM per unit area of SOMF and a process for producing the said catalyst.

33 Claims, No Drawings

HYDROPHOBIC COMPOSITE PD-MEMBRANE CATALYST USEFUL FOR NON-HAZARDOUS DIRECT OXIDATION OF HYDROGEN BY OXYGEN TO HYDROGEN PEROXIDE AND METHOD OF ITS PREPARATION

FIELD OF INVENTION:

This invention relates to a novel hydrophobic composite Pd-membrane catalyst, useful for non-hazardous direct oxidation of hydrogen by oxygen to hydrogen peroxide, and its method of preparation. This invention particularly relates to a novel tubular hydrophobic composite Pd-membrane catalyst comprising Pd-metallic membrane and inorganic porous membrane, useful for non-hazardous direct oxidation of hydrogen by oxygen to hydrogen peroxide while avoiding premixing of feed hydrogen and oxygen gases and its method of preparation. The present invention also relates to a process for the preparation of the hydrophobic composite Pd-membrane catalyst The membrane catalyst of this invention could be used in the chemical industries for the production of hydrogen peroxide by the direct oxidation of hydrogen by oxygen to hydrogen peroxide, which is an environmentally clean process, in a safe manner without any chance of forming explosive hydrogen-oxygen or air mixture.

BACKGROUND AND PRIOR ART DESCRIPTION OF THE INVENTION

Since the disclosure in U.S. Pat. No. 1,108,752 by Henkel et al. that palladium is a catalyst promoting the formation of hydrogen peroxide and water from a mixture of hydrogen and oxygen, a number of palladium containing catalysts, useful for the direct oxidation of hydrogen by oxygen to hydrogen peroxide, have been disclosed by many inventors.

Hydrophilic Catalysts for Direct Oxidation of $H_2$ by $O_2$ to Hydrogen Peroxide A U.S. Pat. No. 4,832,938 by Gosser et al. disclosed a Pt—Pd bimetallic catalyst supported on a carbon, silica or alumina support for making hydrogen peroxide from direct combination of hydrogen and oxygen in an aqueous reaction medium. Later, a German patent Ger. Offen. DE 4,127,918 A1 by Lueckoff et al. disclosed a supported palladium gold catalyst for the manufacture of hydrogen peroxide from hydrogen and oxygen in aqueous medium; the catalyst contains 5–95 wt % Au and is supported on carbon. A number of platinum Group metal containing catalysts: (1) Pt-Group metal on high surface area support, such as carbon, silica or alumina (Ref. U.S. Pat. No. 5,169,618); (2) Pt-Group catalyst on solid acid carrier (Ref. Eur. Pat. Appl. EP 504,741, A1); (3) Pt-Group element supported on Nb- or Ta oxide (Ref. PCT Int. Appl. WO 9,412,428 A1); (4) Sn-modified Pt-Group metals supported on catalysts carriers (Ref. Eur. Pat. Appl. EP 621,235 A1); (5) Pt-Group metal catalyst supported on hydrophilic support (Ref. U.S. Pat. No. 5,399,334); for the oxidation of hydrogen to hydrogen peroxide are known in the prior art.

The above mentioned Pd- or Pt-Group metal containing catalysts are hydrophilic in nature, and hence the aqueous reaction medium used in the oxidation of hydrogen to hydrogen peroxide over these catalysts is in close contact with the catalyst surface. Because of the close contact between the catalyst and the reaction medium, the hydrogen peroxide, which is formed by the reaction between hydrogen and oxygen on the catalyst and then absorbed in the reaction medium due to the high affinity between hydrogen peroxide and water, is reabsorbed on the catalyst from the reaction medium and converted to water and oxygen, and thereby the selectivity for hydrogen peroxide in the process is drastically reduced, when the above mentioned catalysts are used in the oxidation of hydrogen to hydrogen peroxide. Earlier, Fu et al. has also found that only the Pd catalysts supported on hydrophobic carbon support are selective towards hydrogen peroxide formation in the oxidation of hydrogen [Ref L. Fu et al., Stud. Surf. Sci. Catal., 72(1992)33–41].

Hydrophobic Catalysts for Direct Oxidation of $H_2$ by $O_2$ to Hydrogen Peroxide A few Pt-Group or Group VIII metal catalysts deposited on hydrophobic support, useful for the oxidation of hydrogen to hydrogen peroxide, are also known in the prior art.

A Japanese patent Jpn. Kokai Tokyo Koho JP 01133909 A2 by Kyora disclosed a Pt-Group metal catalyst carried on a hydrophobic support such as porous and hydrophobic Teflon support. Chuang in an European patent EP 3660419 A1 disclosed a Group VIII metal catalyst deposited on a hydrophobic support for the manufacture of hydrogen peroxide by reacting hydrogen with oxygen in an aqueous medium. Later, Chuang has disclosed a Group VIII metal on a partially hydrophobic and partially hydrophilic support, such as Pd on fluorinated carbon, as a catalyst for the oxidation of hydrogen to hydrogen peroxide, in PCT Int. Appl. WO 9314025 A1.

Although, the hydrophobic support used in these catalysts provides some hydrophobic character to the Pd- or Group VIII metal catalysts, following are the disadvantages and limitations of the use of hydrophobic support for depositing the metal catalysts:

1) It is difficult to deposit catalytically active components from aqueous solution on a hydrophobic support as there is no wetting of the surface of hydrophobic support by aqueous solution.
2) Hydrophobic support, such as teflon and other hydrophobic polymer support, is thermally unstable at the calcination temperatures, above 300° C., normally employed for decomposing the precursor compounds of catalytically active components of the catalyst.
3) Because of the deposition of catalytically active components, which are hydrophilic in nature, on hydrophobic support, the hydrophobic character of the support is lost completely or at least partially.

Apart form the above mentioned disadvantages and/or limitations, the most important disadvantage of the prior art processes using the above mentioned hydrophobic and hydrophillic catalyst for the direct oxidation of hydrogen by oxygen to hydrogen peroxide is that the feed oxygen and hydrogen gases are mixed before or during the reaction. Since hydrogen when mixed with oxygen or air forms an explosive or a flammable mixture for a very wide range of hydrogen concentration in both oxygen and air, the above mentioned prior art processes are highly hazardous, particularly at the high pressure used in the prior art process. Flammability limits of hydrogen in oxygen and air at the atmospheric pressure are as follows: 4.0–94% $H_2$ in oxygen, and 4.0 to 75.0% $H_2$ in air. The flammability limits widen with increasing the pressure.

The explosion hazards in the direct oxidation of hydrogen by oxygen to hydrogen peroxide can be totally eliminated if the direct mixing of feed hydrogen and oxygen gases and/or the formation of $H_2$—$O_2$ or air mixture during the reaction are avoided by some means.

Pd-Containing Membrane Catalyst for Oxidation of $H_2$ by $O_2$ to Hydrogen Peroxide In order to avoid the explosion hazards due to the formation of explosive hydrogen-oxygen or hydrogen-air mixture, a use of Pd metallic membrane catalyst for the oxidation of hydrogen by oxygen to hydrogen peroxide has also been disclosed in the prior art.

U.S. Pat. No. 4,393,038 dated Jul. 12, 1983 discloses hydrogen peroxide production process in which hydrogen is diffused through a palladium metallic membrane permeable to hydrogen, preferably a gold plated palladium-silver metallic alloy membrane tube, into an aqueous solution containing ions of a stabilizing nature and dissolved oxygen to form hydrogen peroxide and water as a by product. In this process, the membrane used for hydrogen diffusion is a Pd-containing metallic tube, which is self supporting with thickness high enough to avoid collapse of the metallic structure. For the high thickness Pd metallic membrane tube, the flux of hydrogen diffusion through the Pd-membrane is extremely small and hence not of practical interest for producing hydrogen peroxide. Moreover, palladium-silver alloy and gold platted palladium or palladium-silver alloy catalyst membrane of this process have extremely poor selectivity for the oxidation of hydrogen to hydrogen peroxide; the selectivity of hydrogen peroxide, based upon the amount of hydrogen consumed was reported to be 1.44% and less than 1.0%, when the Pd-containing metallic membrane tube was pretreated with stannic chloride followed by hydrolysis and without the pretreatment, respectively. Such a low hydrogen peroxide selectivity is not of practical interest.

Palladium- Group IB metal, such as copper and silver, metallic alloy in a form of thin film supported on inorganic porous membrane for hydrogen separation from $H_2$ containing gases are also known in the prior art (ref. S.Umiya et.al. Journal of Membrane Science, Vol. 56, page 303–313 and 315–325 year 1991). However, because of their extremely poor selectivity or yield for hydrogen peroxide, Pd—Ag or Cu metal alloy membrane supported on an inorganic porous membrane are not suitable as membrane catalyst for the direct oxidation of hydrogen to hydrogen peroxide. A membrane catalyst containing pure palladium metallic membrane also cannot be useful for the direct oxidation of hydrogen to hydrogen peroxide because of its structural instability well known in the prior art. When a pure palladium membrane is operated below 300° C. in hydrogen, β-phase palladium hydride is formed, causing a phase transformation from α to β-hydride accompanied by discontinuous lattice expansion. This phase transformation leads to the formation of pinholes and ultimately to the rupture of the Pd-membrane, and consequently the permeability of the Pd-membrane for hydrogen is lost. The β-phase hydride formation is avoided or suppressed by alloying palladium with Group IB metals (ref. S.Umiya et.al. Journal of Membrane Science, Vol. 56, page 303–313 and 315–325 year 1991).

Because of the above mentioned disadvantages and/or limitations of the prior art catalysts for the direct oxidation of hydrogen to hydrogen peroxide, there is a need for developing a novel Pd-containing membrane catalyst, useful for the non-hazardous direct oxidation of hydrogen to hydrogen peroxide, which is stable in the atmosphere of hydrogen at as below as 100° C. without forming pinholes, has high rates of hydrogen permeation, and also has high selectivity or yield for hydrogen peroxide formation in the direct oxidation of hydrogen to hydrogen peroxide.

OBJECTS OF THE INVENTION

The main object of the present invention is to provide a novel composite Pd containing membrane catalyst useful for the non-hazardous direct oxidation of hydrogen by oxygen to hydrogen peroxide, and having the following important properties:

1) sufficient mechanical strength to withstand conditions such as variation in pressure and temperature,
2) Pd-containing metallic membrane enabling high rates of hydrogen permeation through the metallic membrane on account of reduced thickness of the membrane.
3) No pinhole formation on the thin Pd-containing metallic, thus avoiding functional failure of the membrane when subjected to hydrogen at the process temperature.
4) Membrane catalyst having high selectivity or yield for the formation of hydrogen peroxide in the non-hazardous direct oxidation of hydrogen by oxygen to hydrogen peroxide.
5) Having hydrophobic Pd-membrane.

Another object of the invention is to provide a process for preparation of the novel composite catalyst.

The use of the present novel hydrophobic composite Pd membrane catalyst for direct oxidation of hydrogen by oxygen to produce hydrogen peroxide has been claimed in the applicants co-pending U.S. patent application Ser. No. 09/655,970, filed Sep. 5, 2000.

SUMMARY OF THE INVENTION:

To meet the above objects, the invention provides a novel composite Pd-containing membrane catalyst, useful for formation of hydrogen peroxide, said catalyst having the formula:

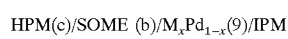

HPM(c)/SOME (b)/$M_xPd_{1-x}$(9)/IPM

Wherein:

IPM is an inorganic ceramic porous membrane, permeable to all gases and vapors; $M_xPd_{1-x}$ is a metal alloy permeable only to hydrogen gas, deposited on one side of IPM; Pd is a palladium metal; M is a metal other than palladium or a mixture of two or more thereof, x is a mole fraction of the metal M in the metal alloy ($M_xPd_{1-x}$), (a) is the weight of the metal alloy per unit area of IPM; SOMF is a surface oxidized thin metal film comprising palladium which is permeable only to hydrogen deposited on the metal alloy ($M_xPd_{1-x}$); (b) is the thickness of SOMF; HPM is a hydrophobic polymer membrane permeable to hydrogen and oxygen gases and also vapors of water and hydrogen peroxide but not to liquid water and aqueous solution, and (c) is the weight of the HPM per unit area of SOMF.

The invention also provides a process for the preparation of the said catalyst.

DETAILED DESCRIPTION OF THE INVENTION

Accordingly, the present invention provides a novel hydrophobic composite Pd-membrane catalyst, useful for the non-hazardous direct oxidation of hydrogen by oxygen to hydrogen peroxide, without a gas phase mixing of hydrogen and oxygen or air, said catalyst having the formula:

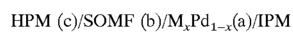

HPM (c)/SOMF (b)/$M_xPd_{1-x}$(a)/IPM

Wherein:

IPM is an inorganic ceramic porous membrane, permeable to all gases and vapors; $M_xPd_{1-x}$ is a metal alloy permeable only to hydrogen gas, deposited on one side of IPM; Pd is a palladium metal; M is a metal other than palladium or a mixture of two or more thereof, x is a mole fraction of the metal M in the metal alloy ($M_xPd_{1-x}$), (a) is the weight of the metal alloy per unit area of IPM; SOMF is a surface oxidized thin metal film comprising palladium which is permeable only to hydrogen deposited on the metal alloy ($M_xPd_{1-x}$); (b) is the thickness of SOMF; HPM is a hydrophobic polymer membrane permeable to hydrogen and oxygen gases and also vapors of water and hydrogen peroxide but not to liquid water and aqueous solution, and (c) is the weight of the HPM per unit area of SOMF.

In an embodiment the inorganic porous membrane (IPM) is selected from the group consisting of type-G-γ-alumina ultrafiltration ceramic, type-Aα-alumina microfiltration ceramic and type Z-zirconia ultrafiltration ceramic porous membrane.

In another embodiment the metal M in the metal alloy $M_xPd_{1-x}$ is selected from the group consisting of copper, silver, gold, ruthenium, noble metals other than Pd or mixtures thereof In another embodiment x is the mole fraction of M, in the metal alloy ($M_xPd_{1-x}$) and present in the range of about 0.1 to about 0.4.

In still another embodiment (a) is the weight of the metal alloy ($M_xPd_{1-x}$) per unit area of the inorganic porous membrane, and is present in the range in about 5.0 $g.m^{-2}$ to about 500 $g.m^{-2}$, preferably in the range 10.0 $g.m^{-2}$ to about 200.0 $g.m^{-2}$.

In still another embodiment (b) is the thickness of the surface oxidized thin metal film, and is present in the range of about 0.05 μm to about 5.0 μm, preferably in the range of about 0.1 μm to about 1.0 μm In yet another embodiment the oxidizing agent in the surface oxidized metal film is selected from the group consisting of $O_2$, $N_2O$, $H_2O_2$, $HClO_4$ HOCl, $KMnO_4$, $K_2Cr_2O_7$, NaClO, NaBrO, $KHSO_5$, organic aeroxides mixtures thereof In yet another embodiment (c) is the weight of EPM (hydrophobic polymer membrane) per unit area of SOMF (surface oxidized metal film), and is present in the range of about 0.2 $g.m^{-2}$ to about 40 $g.m^{-2}$, preferably in the range of about 0.5 $g.m^{-2}$ to about 15 $g.m^{-2}$.

In still another embodiment the hydrophobic polymer membrane is selected from a group of polymers comprising polyflurocarbons, silicon rubbers, polysulfones or mixtures thereof Further, the invention provides a process for preparation of the composite catalyst having the formula:

HPM (c)/SOMF (b)/$M_xPd_{1-x}$(a)/IPM

Wherein:

IPM is an inorganic ceramic porous membrane, permeable to all gases and vapors; $M_xPd_{1-x}$ is a metal alloy permeable only to hydrogen gas, deposited on one side of IPM; Pd is a palladium metal; M is a metal other than palladium or a mixture of two or more thereof, x is a mole fraction of the metal M in the metal alloy ($M_xPd_{1-x}$), (a) is the weight of the metal alloy per unit area of IPM; SOMF is a surface oxidized thin metal film comprising palladium which is permeable only to hydrogen deposited on the metal alloy ($M_xPd_{1-x}$); (b) is the thickness of SOMF; HPM is a hydrophobic polymer membrane permeable to hydrogen and oxygen gases and also vapors of water and hydrogen peroxide but not to liquid water and aqueous solution, and (c) is the weight of the HPM per unit area of SOMF, the said process comprising the steps of:

i) sensitizing and activating one side of the inorganic porous membrane (IPM), which is permeable to normal gases and vapors, by contacting the sides of the IPM alternatively with aqueous solutions of stannous chloride and palladium chloride, and washing with deionized water, ii) depositing on the sensitized and activated side of the inorganic porous membrane, a metal alloy represented by the formula.

$M_xPd_{1-x}$

Wherein; Pd is palladium metal; M is a metal other than palladium or a mixture of two or more metals; and x is a mole fraction of M in the metal alloy, and wherein, the deposition is effected by first depositing Pd and M simultaneously or alternatively using the electroless plating technique, followed by washing with deionized water and drying, and heating to a temperature of about 500° C. under non-oxidizing atmosphere to obtain a Pd-M metal alloy;

iii) depositing a surface oxidized metal film (SOMF) comprising palladium on the metal alloy deposited in step-ii, by the electroless plating technique such that the thickness of the metal film deposited is in the range from about 0.05 to about 5 μm, followed by washing with deionized water and drying the deposited metal film;

iv)oxidizing the surface of the metal film, deposited in step-iii), by contacting the surface of the metal film with an oxidizing agent to obtain at least partially oxidized surface of the metal film; and v) depositing a hydrophobic polymer membrane (HPM), permeable to normal gases and vapors of water and hydrogen peroxide but not to liquid water or aqueous solution, on the surface oxidized metal film (SOMF) obtained in step-iv by contacting SOMF with a non-aqueous solution of a hydrophobic polymer optionally with a cross linking agent, removing the excess polymer solution and evaporating the solvent followed by treating in air or oxygen containing gas at a temperature below about 250° C. to obtain a hydrophobic composite Pd-membrane catalyst.

In an embodiment the inorganic porous membrane is selected from the group consisting of type-G-γ-alumina ultrafiltration ceramic, type-Aα-alumina microfiltration ceramic and type Z-zirconia ultrafiltration ceramic porous membrane.

In another embodiment the metal M in the metal alloy $M_xPd_{1-x}$ is selected from the group consisting of copper, silver, gold ruthenium or mixtures thereof In another embodiment x is the mole fraction of M, in the metal alloy ($M_xPd_{1-x}$) and present in the range of about 0.1 to about 0.4.

In still another embodiment (a) is the weight of the metal alloy ($M_xPd_{1-x}$) per unit area of the inorganic porous membrane, and is present in the range in about 10 $g.m^{-2}$ to about 200 $g.m^{-2}$.

In still another embodiment (b) is the thickness of the surface oxidized thin metal film, and is present in the range of about 0.1 μm to about 1.0 μm.

In yet another embodiment the oxidizing agent in the surface oxidized metal film is selected from the group consisting of $O_2$, $N_2O$, $H_2O_2$, $HClO_4$ HOCL, $KMnO_4$, $K_2Cr_2O_7$, NaClO, NaBrO, $KHSO_5$, organic aeroxides mixtures thereof.

In yet another embodiment (c) is the weight of HPM (hydrophobic polymer membrane) per unit area of SOMF (surface oxidized metal film), and is present in the range of about 0.5 $g.m^{-2}$ to about 15 $g.m^{-2}$.

In still another embodiment invention the hydrophobic polymer is selected from a group of polymers comprising polyflurocarbons, silicon rubbers, polysulfones or mixtures thereof In another embodiment the non-aqueous solvent is selected from dimethylformamide toluene, $C_6$–$C_8$ alkanes, benzene, xylenes, dimethyl acetamide and dimethylsulfoxide.

In yet another embodiment the polymer membrane is applied as a solution.

In yet another embodiment the crosslinking agent is selected from trimethylol propane and benzoyl peroxide.

Thus, the present invention provides a process for the preparation of a novel shydrophobic composite Pd-membrane catalyst, useful for the direct oxidation of hydrogen by oxygen to hydrogen peroxide, while avoiding premixing hydrogen and oxygen gases and thereby avoiding the formation of explosive gas mixture comprising hydrogen and oxygen.

The catalyst of the invention is thus prepared by keeping the three essential requirements for the membrane catalyst by using a mechanically strong inorganic ceramic porous membrane support and depositing a thin non-porous film of Pd-Group IB metal alloy on one side of the support. The requirements of having high selectivity for formation of hydrogen peroxide and hydrophobic Pd-membrane being very critical are accomplished: (i) depositing a very thin surface oxidized metal film comprising palladium on the Pd-Group IB metal alloy film, so that the catalytic reaction occurs on the surface of oxidized metal film rather than on the much less selective Pd-Group IB metal alloy surface for the hydrogen peroxide formation in the direct oxidation of hydrogen, and (ii) depositing a thin hydrophobic polymer membrane which is permeable to normally gases and vapors of hydrogen peroxide and water but not for liquid water or aqueous solution, on the surface oxidized metal film, so that the hydrogen peroxide formed in the oxidation of hydrogen on the surface of the surface oxidized Pd metal film is desorbed and absorbed in the aqueous solution, which is in contact with the hydrophobic polymer membrane, but after its absorption, the hydrogen peroxide cannot go back to the surface oxidized Pd-metal film surface, thus avoiding its decomposition, and thereby increasing the selectivity or yield for the hydrogen peroxide formation in the direct oxidation of hydrogen by oxygen to hydrogen peroxide.

The inorganic ceramic porous membrane tube is used as a porous support for giving mechanical strength to the composite Pd-membrane catalyst. It has high mechanical strength; it does not burst or undergo rupture when subjected to a pressure drop across the membrane of about at least 10 atm. It may consist of γ-alumina, α-alumina, $ZrO_2$, $TiO_2$, carbon, silica, other metal oxides, glass or a mixture of two or more thereof. It may contain micropores (pore dia.: below 1 nm) or mesopores (pore dia.: 1 nm to 20 nm) or macro pores (pore dia.: 20 nm above) or a combination of two or more thereof The composite Pd-membrane may be deposited on the inner or outer surface of the tubular inorganic porous membrane.

The metal alloy is deposited on the one side of the tubular membrane support for forming a continuous non-porous metal alloy film on the surface of the membrane support. The role of the metal alloy film is to allow hydrogen to permeate or diffuse selectively without forming β-palladium hydride phase, but not to allow permeation of any gas or compound other than hydrogen. The role of metal other than palladium in the metal alloy film is to avoid or drastically reduce the formation of β-palladium hydride phase and thereby increasing the stability of the metal film membrane against the creation of pinholes during its use in presence of hydrogen for the direct oxidation of hydrogen to hydrogen peroxide.

The deposition of metal film comprising palladium on the metal alloy film in step-iii) and its surface oxidation in step-iv) are very critical for the composite Pd-membrane catalyst to be selective in the direct oxidation of hydrogen by oxygen to hydrogen peroxide. In the absence of SOMF (surface oxidized metal film), the selectivity of the membrane catalyst for the formation of $H_2O_2$ in the oxidation of $H_2$ is very low.

A number of oxidizing agents, such as $O_2$, $N_2O$, $H_2O_2$, $HClO_4$, HOCl, $KMnO_4$, $K_2Cr_2O_7$, NaClO, NaBrO, $KHSO_5$, organic aeroxides and the like; are known in the prior art.

The deposition of the hydrophobic polymer membrane, HPM, which is permeable to normally gases and also vapours of water and hydrogen peroxide but not to liquid water or aqueous solution, on SOMF (surface oxidized metal film), is also critical for making the composite Pd-membrane catalyst much more selective. Due to the presence of hydrophobic polymer membrane in the composite Pd-membrane catalyst, a higher selectivity for the $H_2O_2$ formation in the direct oxidation of hydrogen results from the fact that, the hydrogen peroxide formed in the oxidation of hydrogen by oxygen at the interface of SOMF and the hydrophobic polymer membrane, HPM, is absorbed in aqueous solution in contact with HPM, because of the strong affinity of hydrogen peroxide with water, but once absorbed in the aqueous solution, the hydrogen peroxide form the aqueous solution cannot return back to the surface oxidized metal film SOMF, which also acts as a catalyst for the hydrogen peroxide decomposition. Thus, because of the presence of HPM between SOMF and the aqueous reaction medium, the catalytic decomposition of hydrogen peroxide once formed and absorbed in the aqueous reaction medium is eliminated or drastically reduced and consequently the selectivity of hydrogen peroxide formation is increased.

A number of polyfluorocarbons, polysulfones and polysiloxanes (commonly known as silicone rubbers), which are hydrophobic polymers and hence are not wetted by water or aqueous solution, are known in the prior art. Examples of polyfluorocarbons are PVDF (polyvinylidine fluoride); polyvinylidine fluoride-hexaflouropropylene copolymer, polytetraflouroethylene, polychloro-trifluoroethylene and polyethylenetetrafluoroethylene copolymer. Examples of polysulfones are polysulfone, polyethersulfone, polyphenylsulfone and other hydrophobic polymer containing sulfur dioxide groups. Examples of polysiloxanes or silicone rubbers are polydimethylsiloxane, polymethylphenylsiloxane, polytrifluoropropylmethylsiloxane and copolymers of dimethylsiloxane with methylphenylsiloxane, phenylvinylsiloxane or methylvinylsiloxane. Other examples of hydrophobic polymer are polysulfide rubbers. Among these hydrophobic polymer, the more preferred hydrophobic polymer is selected from a group consisting of polyvinylidine fluoride, polyethersulfone, and polydimethyl siloxane containing less than 1% vinyl groups.

In step-v) of the process of this invention, the non-aqueous solvent for hydrophobic polymer solution may be selected from $C_6$–$C_8$ alkanes, benzene, toluene, xylenes, dimethyl acetamide, dimethyl formamide and dimethylsulfoxide and the cross linking agent, when used, may be trimethylol propane or benzoyl peroxide or a commercial product for example SLE 5300B obtained from GE Silicones (India) Pvt. Ltd.

The sensitization and activation of one side of the IPM (inorganic porous membrane) in the step-i) of said method is essential for initiating the electroless plating or deposition of said metal alloy on IPM.

The electroless plating or deposition of metal on porous inorganic solid surface is well known in the prior art (ref S.Umiya et.al. Journal of Membrane Science, Vol. 56, page 303–313 and 315–325 year 1991).

In step-ii) of said method, the heating at a temperature of at least about 500° C. is essential for the formation of said metal alloy.

In the said membrane catalyst and its preparation method of this invention, the preferred metal other than palladium in said metal alloy, M, is silver, gold, ruthenium or noble group metals or a mixture thereof, the preferred value of x is in the range from about 0.1 to about 0.4; the preferred weight of said metal alloy per unit area of IPM, (a) is in the range from about 10 $g.m^{-2}$ to about 200 $g.m^{-2}$; (b) the preferred thickness of SOMF (surface oxidized metal film) is in the range from about 0.1 $\mu m$ to about 1.0 $\mu m$; the preferred oxidizing agent is selected from $N_2O$ (nitrous oxide), $H_2O_2$, $HClO_4$ or a mixture thereof; the preferred weight of HPM (hydrophobic polymer membrane) per unit area of SOMF (surface oxidized metal film), (c) is in the range from about 0.5 $g.m^{-2}$ to about 15 $g.m^{-2}$; the hydrophobic polymer, used in step-v), is selected from a group consisting of polyfluro carbons, polysiloxanes or silicon rubbers, polysulfones or a mixture thereof.

The composite Pd-membrane catalyst prepared by the method of this invention can be used for the production of hydrogen peroxide by the direct oxidation of hydrogen by oxygen, without forming an explosive gaseous mixture of hydrogen and oxygen or air and thereby avoiding the explosion hazards.

The present invention is described with respect to the following examples illustrating the method of this invention for the preparation of said membrane catalyst useful for the non-hazardous direct oxidation of hydrogen by oxygen to hydrogen peroxide. These examples are provided for illustrative purposes only and are not to be construed as limitations of the said membrane catalyst and its preparation method of this invention.

Definition of Terms Used in Examples

EDTA is Ethylene diamine tetra acetic acid

PVDF is Polyvinylidene fluoride

DMF is Dimethyl formamide

The concentration of metals in the metal alloy of the membrane catalyst is given on the basis of wt % of a particular metal in the metal alloy.

The rate of hydrogen permeation is defined as the amount of hydrogen diffused through the membrane of the membrane catalyst per unit surface area of the membrane per unit time.

EXAMPLE-1

This example illustrates the method of this invention for the preparation of a novel hydrophobic composite Pd-membrane catalyst.

The membrane catalyst was prepared in the following five sequential steps:

Step (i): Sensitization and activation of the inner surface of a Type G, γ-alumina ultra filtration ceramic porous membrane tube obtained from Societe des Ceramiques Techniques, France, having inner diameter of 7 mm, outer diameter of 10 mm and length of 250 mm and pore size of 5 nm, was effected by closing one end of the membrane tube by a teflon cap and then contacting the inner surface of the tube for 0.5 h alternatively with 0.1 wt % stannous chloride aqueous solution and 0.1 wt % palladium chloride aqueous solution for 10 times, by filling the membrane tube with the respective solutions, and then washing with deionized water;

Step (ii): Electroless deposition of palladium and silver simultaneously on the sensitized and activated surface was carried out by contacting it with 10 ml aqueous solution containing mixed Pd-EDTA and Ag-EDTA complexes and hydrazine, as a reducing agent, prepared by dissolving a mixture of 2.0 g $PdCl_2$, 0.08 g $AgNO_3$, 34.0 g disodium salt of EDTA and 0.12 g hydrazine in one liter of 25% ammonium hydroxide solution;, or a period of 2 h repeatedly for 30 times and then washing with deionized water; removing the teflon cap, drying, and then heating under nitrogen at 500° C. for 4 h, so that Pd—Ag metal alloy film is formed on the inner surface of the porous ceramic membrane tube.

Step (iii): Electroless deposition of palladium on the Pd—Ag metal alloy film was done by closing an end of the membrane tube by a teflon cap and then contacting metal alloy film with 10 ml aqueous solution, prepared by dissolving 4.0 g $PdCl_2$, 65 g disodium salt of EDTA and 0.12 g hydrazine in 1000 ml of 25% ammonium hydroxide solution, for a period of 2 h repeatedly for 3 times to form a thin film of Pd on the Pd—Ag alloy and then washing with deionized water.

Step (iv): Surface oxidation of the Pd-metal film is effected by contacting it with a column of 30% $H_2O_2$ solution for 1 h. repeatedly for 5 times, and then washing with deionized water and drying.

Step (v): Deposition of a hydrophobic polymer merobane on the surface oxidized Pd metal film has done by containing it with a column of non-aqueous polymer solution containing 2.0 wt % PVDF (Polyvinylidene fluoride) in DMF (didimethyl formamide) solvent for 30 minutes, removing the excess polymer solution and evaporating the solution leaving a thin film of the polymer on the inner surface of the membrane, removing the teflon cap and then drying the membrane tube in air at 110° C. for 1 hr, to provide the hydrophobic composite membrane catalyst of this invention having a formula: Hydrophobic PVDF membrane (2.6 $g.m^{-2}$)/PdO—Pd film(3.4 $g.m^{-2}$, thickness=0.3 $\mu m$)/Pd (89 wt %)—Ag (11 wt %) metal alloy (36.2 $g.m^{-2}$)/γ-alumina ceramic porous membrane.

The amount of metal deposited in the electroless plating was estimated by analyzing the solutions for its metal content before the electroless deposition and after the electroless deposition.

The rate of hydrogen permeation through the membrane catalyst was measured by contacting the outer surface of the tubular membrane catalyst with $H_2$ gas at a constant pressure of 20 psig at 8° C. in a conventional tubular membrane reactor and passing continuously oxygen gas at a flow rate of 100 ml/min inside of tubular membrane catalyst at a pressure of 0.5 psig and determining the amount of $H_2$ permeated through the composite membrane catalyst by measuring a fall of $H_2$ pressure in the $H_2$ reservoir connected to the membrane reactor, through a pressure regulator, for a known period, after attaining a steady state. The fall in the pressure of $H_2$ reservoir was only due to the $H_2$ permeation through the membrane catalyst. When $H_2$ gas was replaced by pure $N_2$ there was no fall in the pressure in the $N_2$ gas reservoir for a period of 2 h, indicating that the catalyst membrane was without pinholes and also not permeable to $N_2$ gas. The rate of $H_2$ permeation through the membrane catalyst was 28 $\mu.mol\ s^{-1}.m^{-2}$.

EXAMPLE-2

A novel hydrophobic composite Pd-membrane catalyst of this invention was prepared by the five sequential steps same as that described in Example-1 except that, in step-v, the Pd-metal film was contacted with a column of non aqueous solution containing 1.0 wt % silicon rubber (polydimethylsiloxane with less than 1% vinyl group) and 0.1 wt % trimethylol propane, which is a cross linking agent, in toluene solvent for 1 h, the solution was removed by draining it out from the membrane tube and then the membrane tube was heated in air at 120° C. for a period of 2 h to provide a novel hydrophobic composite Pd-membrane catalyst having formula: Hydrophobic silicon rubber membrane (0.5 $g.m^{-2}$)/PdO—Pd film(3.4 $g.m^{-2}$, thickness=0.3 $\mu$m)/Pd (89 wt %)Ag(11 wt %) metal alloy (36.2 $g.m^{-2}$)/γ-alumina ceramic porous membrane.

The rate $H_2$ permeation through the membrane catalyst, measured by the procedure same as that described in Example-1, was 28.5 $\mu mol.s^{-1}m^{-2}$. The membrane catalyst was without pinholes and permeable only to hydrogen.

EXAMPLE-3

A novel hydrophobic composite Pd-membrane catalyst of this invention was prepared by the five sequential steps same as that described in Example-1 except that, in step-v, the Pd-metal film was contacted with a column of non aqueous solution containing 3 wt % polysulfone (mol. wt.≡26000) in DMF solvent for 1 h, the solution was removed by draining it out from the membrane tube and then the membrane tube was heated in air at 150° C. for a period of 1 h to provide a novel hydrophobic composite Pd-membrane catalyst having formula: Hydrophobic Polysulfone membrane (4.1 $g.m^{-2}$)/PdO—Pd film(3.4 $g.m^{-2}$, thickness=0.3 $\mu$m)/Pd (89 wt %)–Ag (11 wt %) metal alloy (36.2 $g.m^{-2}$)/γ-alumina ceramic porous membrane.

The rate $H_2$ permeation through the membrane catalyst, measured by the procedure same as that described in Example-1, was 27.3 $\mu mol.s^{-1}m^{-2}$. The membrane catalyst was without pinholes and permeable only to hydrogen.

EXAMPLE-4

A novel hydrophobic composite Pd-membrane catalyst of this invention was prepared by the five sequential steps same as that described in Example-2 except that, the concentration of silicon rubber and trimethylol propane is changed from 1 wt % to 5 wt % and from 0.1 wt % to 0.5 wt %, respectively, and also repeating the step-v for 3 times to provide a novel hydrophobic composite Pd-membrane catalyst having formula: Hydrophobic silicon rubber membrane (14.5 $g.m^{-2}$)/PdO—Pd film(3.4 $g.m^{-2}$, thickness=0.3 $\mu$m)/Pd (89 wt %)–Ag (11 wt %) metal alloy (36.2 $g.m^{-2}$)/γ-alumina ceramic porous membrane.

The rate $H_2$ permeation through the membrane catalyst, measured by the procedure same as that described in Example-1, was 26.5 $\mu mol.s^{-1}m^{-2}$. The membrane catalyst was without pinholes and permeable only to hydrogen.

EXAMPLE-5

A novel hydrophobic composite Pd-membrane catalyst of this invention was prepared by the five sequential steps of the process of this invention, out of which, step-i, iii,iv and v are exactly same as that described in Example-1 and the second step (step-ii) was as follows:

Step-(ii):Electroless deposition of palladium and silver alternatively on the sensitized and activated surface was effected by contacting it alternatively with a Pd-plating solution, prepared by dissolving 4.3 g $PdCl_2$, 65 g disodium salt of EDTA and 0.12 g hydrazine in 1000 ml 25% ammonium hydroxide solution, for a period of 2 h, and with a Ag-plating solution prepared by dissolving 4.9 g $AgNO_3$, 65.0 g disodium salt of EDTA and 0.12 g hydrazine in a 1000 ml 25% ammonium hydroxide solution, for a period 2h, and repeating the alternate deposition of Pd and Ag, until the amount of Pd and Ag deposited on the membrane tube was 0.64 g and 0.23 g, respectively, The Pd—Ag metal deposited membrane tube was then heated in nitrogen at 600° C. for 2 h, so that Pd—Ag metal alloy film is formed on the inner surface of the membrane tube.

The formula or composition of the resulting catalyst was Hydrophobic PVDF membrane (2.6 $g.m^{-2}$)/PdO—Pd film (3.4 $g.m^{-2}$, thickness=0.3 $\mu$m)/Pd (74 wt %)–Ag (26wt %) metal alloy (195 $g.m^{-2}$)/γ-alumina ceramic porous membrane.

The rate at which $H_2$ permeation through the membrane catalyst, measured by the procedure same as that described in Example-1, was 19.6 $\mu mol.s^{-1}m^{-2}$. The membrane catalyst was without pinholes and permeable only to hydrogen.

EXAMPLE-6

A novel hydrophobic composite Pd-membrane catalyst of this invention was prepared by the five sequential steps same as that described in Example-5 except that, in step-i, instead of a Type -G γ-alumina ultrafiltration ceramic porous membrane tube, a Type-Aα-alumina microfiltration ceramic porous membrane tube with a pore size of 200 nm, was used as a porous inorganic ceramic membrane support for the membrane catalyst and, also in step-ii, the amount of Pd and Ag deposited was different.

The formula/composition of the resulting catalyst was Hydrophobic PVDF membrane (2.6 $g.m^{-2}$)/PdO—Pd film (3.3 $g.m^{-2}$, thickness=0.3 $\mu$m)/Pd (71 wt %)–Ag (29 wt %) metal alloy (221 $g.m^{-2}$)/α-alumina ceramic membrane tube.

The rate at which $H_2$ permeation through the membrane catalyst at 30° C., measured by the procedure same as that described in Example-1, was 27.5 $\mu mol.s^{-1}m^{-2}$. The membrane catalyst was without pinholes and permeable only to hydrogen.

EXAMPLE-7

A novel hydrophobic composite Pd-membrane catalyst of this invention was prepared by the five sequential steps same as that described in Example-1 except that, in step-i, instead of a Type -G γ-alumina ultrafiltration ceramic porous membrane tube, a Type-Z zirconia ultrafiltration ceramic porous membrane tube with a pore size of 20 nm, was used as a porous support for the membrane catalyst and, in step-ii, instead of 0.08 g $AgNO_3$, 0.03 g $AgNO_3$, was used in the preparation of the membrane catalyst.

The formula/composition of the resulting catalyst was Hydrophobic PVDF membrane (2.6 $g.m^{-2}$)/PdO—Pd film (3.3 $g.m^{-2}$, thickness=0.3 $\mu$m)/Pd(95 wt %)–Ag (5 wt %) metal alloy (71 $g.m^{-2}$)/zirconia ceramic porous membrane.

The rate at which $H_2$ permeation through the membrane catalyst at 30° C., measured by the procedure same as that described in Example-1, was 36 $\mu mol.s^{-1}m^{-2}$. The membrane catalyst was without pinholes and permeable only to hydrogen.

EXAMPLE-8

A novel hydrophobic composite Pd-membrane catalyst of this invention was prepared by the five sequential steps same as that described in Example-6 except that, in step-iii, the electroless deposition of Pd was done repeatedly for 15 times.

The formula/composition of the resulting catalyst was Hydrophobic PVDF membrane (2.6 g.m$^{-2}$)/PdO—Pd film (12.8 g.m$^{-2}$, thickness=1.1 $\mu$m)/Pd (71 wt %)–Ag (29 wt %) metal alloy (221 g.m$^{-2}$)/$\alpha$-alumina ceramic membrane tube.

The rate at which $H_2$ permeation through the membrane catalyst at 30° C., measured by the procedure same as that described in Example-1, was 22.5 $\mu$mol.s$^{-1}$m$^{-2}$. The membrane catalyst was without pinholes and permeable only to hydrogen.

EXAMPLE-9

A novel hydrophobic composite Pd-membrane catalyst of this invention was prepared by the five sequential steps same as that described in Example-1, except that in step-ii, instead of a mixture of 2.0 g $PdCl_2$, 0.08 g $AgNO_3$, 34 g disodium salt of EDTA and 0.12 g hydrazine, a mixture of 1.8 g $PdCl_2$, 0.15 g $RuCl_3$, 0.1 g $PtCl_4$, 0.02 g $AuCl_3$, 0.06 g $AgNO_3$, 35.0 g disodium salt of EDTA and 0.15 g hydrazine was used.

The formula/composition of the resulting catalyst was Hydrophobic PVDF membrane (2.6 g.m$^{-2}$)/PdO—Pd film (3.4 g.m$^{-2}$, thickness=0.3 $\mu$m)/Pd (81%) Ru (5%) Pt (3.5%) Au (4%) Ag (6.5%) metal alloy (41.1 g.m$^{-2}$)/$\gamma$-alumina ceramic porous membrane.

The rate at which $H_2$ permeation through the membrane catalyst at 30° C., measured by the procedure same as that described in Example-1, was 25.7 $\mu$mol.s$^{-1}$m$^{-2}$. The membrane catalyst was without pinholes and permeable only to hydrogen.

EXAMPLE-10

A novel hydrophobic composite Pd-membrane catalyst of this invention was prepared by the five sequential steps same as that described in Example-8, except that, in step-iv, instead of contacting the Pd metal film with 30% $H_2O_2$, the Pd film was contacted with 0,1 molar aqueous perchloric acid ($HClO_4$) for 1 minute, the acid solution was drained out and the membrane tube was heated slowly up to 300° C. and cooled to room temperature. This procedure was repeated for three times.

The rate at which $H_2$ permeation through the membrane catalyst at 30° C., measured by the procedure same as that described in Example-1, was 23.6 $\mu$mol.s$^{-1}$m$^{-2}$. The membrane catalyst was without pinholes and permeable only to hydrogen.

EXAMPLE-11

A novel hydrophobic composite Pd-membrane catalyst of this invention was prepared by the five sequential steps same as that described in Example-8, except that, in step-iv, instead of contacting the Pd metal film with 30% $H_2O_2$, the Pd film was contacted with nitrous oxide ($N_2O$) gas by passing 10 mol% $N_2O$ in nitrogen over the Pd-film at 280° C. for 3 h.

The rate at which $H_2$ permeation through the membrane catalyst at 30° C., measured by the procedure same as that described in Example-1, was 24.1 $\mu$mol.s$^{-1}$m$^{-2}$. The membrane catalyst was without pinholes and permeable only to hydrogen.

EXAMPLE-12

A novel hydrophobic composite Pd-membrane catalyst used in this invention was prepared by the five sequential steps same as that described in Example-1, except that in step-ii, instead of a mixture of 2.0 g $PdCl_2$, 0.08 g $AgNO_3$, 34 g disodium salt of EDTA and 0.12 g hydrazine, a mixture of 1.8 g $PdCl_2$, 0.15 g $RuCl_3$, 0.1 g $PtCl_4$, 0.02 g $AuCl_3$, 0.06 g $AgNO_3$, 35.0 g disodium salt of EDTA and 0.15 g hydrazine was used.

The formula/composition of the resulting catalyst was Hydrophobic PVDF membrane (2.6 g.m$^{-2}$)/PdO—Pd film (3.4 g.m$^{-2}$, thickness=0.3 $\mu$m)/Pd (81%) Ru (5%) Pt (3.5%) Au (4%) Ag (6.5%) metal alloy (41.1 g.m$^{-2}$)/$\gamma$-alumina ceramic porous membrane.

The rate at which $H_2$ permeation through the membrane catalyst at 30° C., measured by the procedure same as that described in Example-1, was 25.7 $\mu$mol.s$^{-1}$m$^{-2}$. The membrane catalyst was without pinholes and permeable only to hydrogen.

EXAMPLE-13

A novel hydrophobic composite Pd-membrane catalyst used in this invention was prepared by the five sequential steps same as that described in Example-12 or 8, except that, in step-iv, instead of contacting the Pd metal film with 30% $H_2O_2$ , the Pd film was contacted with 0,1 molar aqueous perchloric acid ($HClO_4$) for 1 minute, the acid solution was drained out and the membrane tube was heated slowly up to 300° C. and cooled to room temperature. This procedure was repeated for three times.

The rate at which $H_2$ permeation through the membrane catalyst at 30° C., measured by the procedure same as that described in Example-1, was 23.6 $\mu$mol.s$^{-1}$m$^{-2}$. The membrane catalyst was without pinholes and permeable only to hydrogen.

Novel features and advantages of the composite Pd-membrane catalyst of present invention over the prior art catalysts useful for the direct oxidation of hydrogen by oxygen to hydrogen,peroxide 1) In case of the prior art non-membrane type Pd-catalysts, during their use in the direct oxidation of hydrogen by oxygen to hydrogen peroxide, hydrogen and oxygen gases, both dissolved simultaneously in an aqueous solution, react on the catalyst surface and there is a presence of an explosive gaseous mixture of hydrogen and oxygen, which can be highly hazardous. On the contrary, in case of the composite Pd-membrane catalyst of this invention, during its use in the direct oxidation of hydrogen by oxygen to hydrogen peroxide, there is no mixing of $H_2$ and $O_2$ gases or formation of gaseous explosive mixture of $H_2$ and $O_2$ because hydrogen diffused or permeated through the composite membrane in a form of atomic hydrogen reacts with the molecular oxygen, dissolved in an aqueous solution, on the surface oxidized metal film of the membrane catalyst and hence there is no possibility of explosion during the direct oxidation of hydrogen by oxygen to hydrogen peroxide.
2) As compared to the Pd-membrane catalyst known in the prior art for the direct oxidation of $H_2$ to $H_2O_2$ , the hydrophobic composite Pd-membrane catalyst of this invention has following novel features and advantages:
   (i) Because of the use of inorganic porous membrane as a support, the membrane catalyst is robust and has a high mechanical strength even though the metal alloy and surface oxidized metal film comprising palladium in the membrane catalyst are much thinner.
   (ii) Because of thin metal alloy and surface oxidized metal films deposited on the inorganic porous membrane support, the rate of hydrogen permeation through the membrane catalyst is much larger.

(iii) Because of the deposition of surface oxidized metal film on the metal alloy containing Pd, the membrane catalyst is more selective for the formation of $H_2O_2$ in the direct oxidation of hydrogen as palladium oxide is more selective than palladium metal or the metal alloy containing palladium.

(iv) Because of the deposition of a thin film of a hydrophobic polymer membrane, which separates the aqueous reaction medium and the catalytically active surface oxidized metal film of the membrane catalyst to avoid a direct contact between the aqueous reaction medium containing $H_2O_2$ and the catalytically active surface of the membrane catalyst, the selectivity of the membrane catalyst for the formation of $H_2O_2$ in the direct oxidation of hydrogen is much higher. The $H_2O_2$ formed in the direct oxidation of $H_2$ over the surface oxidized metal film is absorbed in the aqueous reaction medium due to the strong affinity of $H_2O_2$ to water and once absorbed the $H_2O_2$ cannot return back to the surface oxidized metal film and thereby avoiding its catalytic decomposition to water and oxygen and consequently the selectivity of the formation of $H_2O_2$ in the direct oxidation of hydrogen is increased.

The advantages involved in using the present novel catalyst in the process of producing hydrogen peroxide have been clearly illustrated in the applicants co-pending U.S. patent application Ser. No. 09/655,970 filed on even date.

What is claimed is:

1. A hydrophobic composite Pd-membrane catalyst, useful for the non-hazardous direct oxidation of hydrogen by oxygen to hydrogen peroxide, without a gas phase mixing of hydrogen and oxygen or air, said catalyst represented by the formula:

$$HPM\ (c)/SOMF\ (b)/M_xPd_{1-x}(a)/IPM$$

wherein:

IPM is an inorganic ceramic porous membrane, permeable to all gases and vapors; $M_xPd_{1-x}$ is a metal alloy permeable only to hydrogen gas, deposited on one side of IPM; Pd is a palladium metal; M is a metal other than palladium or a mixture of two or more thereof, x is a mole fraction of the metal M in the metal alloy ($M_xPd_{1-x}$), (a) is the weight of the metal alloy per unit area of IPM; SOMF is a surface oxidized thin metal film comprising palladium which is permeable only to hydrogen deposited on the metal alloy ($M_xPd_{1-x}$); (b) is the thickness of SOMF; HPM is a hydrophobic polymer membrane permeable to hydrogen and oxygen gases and also vapors of water and hydrogen peroxide but not to liquid water and aqueous solution, and (c) is the weight of the BPM per unit area of SOMF.

2. A catalyst as claimed in claim 1 wherein the inorganic porous membrane (IPM) is in a form of tube having thickness of at least 0.5 mm and internal diameter 6.0 mm.

3. A catalyst as claimed in claim 1 wherein the inorganic porous membrane (IPM) is selected from the group consisting of type-G-γ-alumina ultrafiltration ceramic, type-Aα-alumina microfiltration ceramic and type Z-zirconia ultrafiltration ceramic porous membrane.

4. A catalyst as claimed in claim 1 wherein the metal M in the metal alloy $M_xPd_{1-x}$ is selected from the group consisting of copper, silver, gold, ruthenium or noble metal other than Pd, and mixtures thereof.

5. A catalyst as claimed in claim 1 wherein x is the mole fraction of M, in the metal alloy ($M_xPd_{1-x}$) and is present in the range of about 0.1 to about 0.4.

6. A catalyst as claimed in claim 1 wherein (a) is the weight of the metal alloy ($M_xPd_{1-x}$) per unit area of the inorganic porous membrane, and is present in the range in about 5.0 $g.m^{-2}$ to about 500 $g.m^{-2}$.

7. A catalyst as claimed in claim 1 wherein (a) is the weight of the metal alloy ($M_xPd_{1-x}$) per unit area of the inorganic porous membrane, and is present in the range in about 10 $g.m^{-2}$ to about 200 $g.m^{-2}$.

8. A catalyst as claimed in claim 1 wherein (b) is the thickness of the surface oxidized thin metal film, and is present in the range of about 0.05 μm to about 5.0 μm.

9. A catalyst as claimed in claim 1 wherein (b) is the thickness of the surface oxidized thin metal film, and is present in the range of about 0.1 μm to about 1.0 μm.

10. A catalyst as claimed in claim 1 wherein the oxidizing agent in the surface oxidized metal film is selected from the group consisting of $O_2$, $N_2O$, $H_2O_2$, $HClO_4$ HOCl, $KMnO_4$, $K_2Cr_2O_7$, NaClO, NaBrO, $KHSO_5$, organic aeroxides, and mixtures thereof.

11. A catalyst as claimed in claim 1 wherein (c) is the weight of HPM (hydrophobic polymer membrane) per unit area of SOMF (surface oxidized metal film), and is present in the range of about 0.2 $g.m^{-2}$ to about 40 $g.m^{-2}$.

12. A catalyst as claimed in claim 1 wherein (c) is the weight of HPM (hydrophobic polymer membrane) per unit area of SOMF (surface oxidized metal film), and is present in the range of about 0.5 $g.m^{-2}$ to about 15 $g.m^{-2}$.

13. A catalyst as claimed in claim 1 wherein the hydrophobic polymer membrane is selected from the group of polymers comprising polyflurocarbons, silicon rubbers, polysulfones or mixtures thereof.

14. A process for preparation of the composite catalyst having the formula:

$$HPM\ (c)/SOMF\ (b)/M_xPd_{1-x}(a)/IPM$$

IPM is an inorganic ceramic porous membrane, permeable to all gases and vapors, in a form of tube having a thickness of at least 0.5 mm and internal diameter of 6.0 mm; $M_xPd_{1-x}$ is a metal alloy permeable only to hydrogen gas, deposited on one side of IPM; Pd is a palladium metal; M is a metal other than palladium or a mixture of two or more thereof, x is a mole fraction of the metal M in the metal alloy ($M_xPd_{1-x}$), (a) is the weight of the metal alloy per unit area of IPM; SOMF is a surface oxidized thin metal film comprising palladium, metal alloy ($M_xPd_{1-x}$); (b) is the thickness of SOMF; HPM is a hydrophobic polymer membrane, and (c) is the weight of the HPM per unit area of SOMF;

said process comprising the steps of:

(i) sensitizing and activating one side of the inorganic porous membrane (IPM), which is permeable to normal gases and vapors, by contacting the sides of the IPM alternatively with aqueous solutions of stannous chloride and palladium chloride, and washing with deionized water, (ii) depositing on the sensitized and activated side of the inorganic porous membrane, a metal alloy represented by the formula:

$$M_xPd_{1-x}$$

wherein: Pd is palladium metal; M is a metal other than palladium or a mixture of two or more metals; and x is a mole fraction of M in the metal alloy, and wherein, the deposition is effected first by depositing Pd and M simultaneously or alternatively using the electroless plating technique, followed by washing with deionized water and drying, and heating to a temperature of about 500° C. under non-oxidizing atmosphere to obtain a Pd-M metal alloy coated IPM;

(iii) depositing a surface oxidized metal film (SOMF) comprising palladium on the metal alloy deposited in step (ii), by the electroless plating technique such that the thickness of the metal film deposited is in the range from about 0.05 to about 5 μm, followed by washing with deionized water and drying the deposited metal film;

(iv) oxidizing the surface of the metal film deposited in step (iii) by contacting the surface of the metal film with an oxidizing agent to obtain at least partially oxidized surface of the metal film; and (v) depositing a hydrophobic polymer membrane (HPM), permeable to normal gases and vapors of water and hydrogen peroxide but not to liquid water or aqueous solution, on the surface oxidized metal film (SOMF), obtained in step-(iv) by contacting SOMF with a non-aqueous solution of a hydrophobic polymer, optionally, with a cross linking agent, removing the excess polymer solution and evaporating the solvent followed by treating in air or oxygen containing gas at a temperature below about 250° C. to obtain a hydrophobic composite Pd-membrane catalyst.

15. A process as claimed in claim 14 wherein the inorganic porous membrane is selected from the group consisting of type-G-γ-alumina ultrafiltration ceramic, type-Aα-alumina microfiltration ceramic and type Z-zirconia ultrafiltration ceramic porous membrane.

16. A process as claimed in claim 14 wherein the metal M in the metal alloy $M_xPd_{1-x}$ is selected from the group consisting of copper, silver, gold, ruthenium, and mixtures thereof.

17. A process as claimed in claim 14 wherein x is the mole fraction of M, in the metal alloy ($M_xPd_{1-x}$) and present in the range of about 0.1 to about 0.4.

18. A process as claimed in claim 14 wherein (a) is the weight of the metal alloy ($M_xPd_{1-x}$) per unit area of the inorganic porous membrane, and is present in the range in about 5.0 $g.m^{-2}$ to about 500 $g.m^{-2}$.

19. A process as claimed in claim 14 wherein (a) is the weight of the metal alloy ($M_xPd_{1-x}$) per unit area of the inorganic porous membrane, and is present in the range in about 10 $g.m^{-2}$ to about 200 $g.m^{-2}$.

20. A process as claimed in claim 14 wherein (b) is the thickness of the surface oxidized thin metal film, and is present in the range of about 0.05 μm to about 5.0 μm.

21. A process as claimed in claim 14 wherein (b) is the thickness of the surface oxidised thin metal film, and is present in the range of about 0.1 μm to about 1.0 μm.

22. A process as claimed in claim 14 wherein the oxidising agent in the surface oxidised metal film is selected from the group consisting of $O_2$, $N_2O_2$, $H_2O$, $HClO_4$ HOCl, $KMnO_4$, $K_2Cr_2O_7$, NaClO, NaBrO, $KHSO_5$, organic aeroxides, and mixtures thereof.

23. A process as claimed in claim 14 wherein (c) is the weight of HPM (hydrophobic polymer membrane) per unit area of SOMF (surface oxidized metal film), and is present in the range of about 0.2 $g.m^{-2}$ to about 40 $g.m^{-2}$.

24. A process as claimed in claim 14 wherein (c) is the weight of HPM (hydrophobic polymer membrane) per unit area of SOMF (surface oxidized metal film), and is present in the range of about 0.5 $g.m^{-2}$ to about 15 $g.m^{-2}$.

25. A process as claimed in claim 14 wherein the hydrophobic polymer is selected from a group of polymers comprising polyflurocarbons, silicon rubbers, polysulfones or mixtures thereof.

26. A process as claimed in claim 14 wherein the non-aqueous solvent is selected from a group consisting of dimethylformamide toluene, $C_6$–$C_8$ alkanes, benzene, xylenes, dimethyl acetamide, and dimethylsulfoxide.

27. A process as claimed in claim 14 wherein the deposition of the polymer membrane is done by applying the non-aqueous polymer solution on the surface oxidized Pd-metal film and drying it.

28. A process as claimed in claim 14 wherein the cross-linking agent is selected from a group consisting of trimethylol propane and benzoyl peroxide.

29. A process as claimed in claim 14 wherein the sensitization and activation of the inner surface of a Type G, γ-alumina ultra filtration ceramic porous membrane tube having inner diameter of 7 mm, outer diameter of 10 mm and length of 250 mm and pore size of 5 nm, was effected by closing one end of the membrane tube by a teflon cap and then contacting the inner surface of the tube for 0.5 h alternatively with 0.1 wt % stannous chloride aqueous solution and 0.1 wt % palladium chloride aqueous solution for 10 times, by filling the membrane tube with the respective solutions, and then washing with deionized water.

30. A process as claimed in claim 14 wherein the deposition of metal alloys is done by electroless deposition of palladium and silver simultaneously on the sensitized and activated surface, said electroless deposition is carried out by contacting the surface with 10 ml aqueous solution containing mixed Pd-EDTA and Ag-EDTA complexes and hydrazine, as a reducing agent, prepared by dissolving a mixture of 2.0 g $PdCl_2$, 0.08 g $AgNO_3$, 34.0 g di-sodium salt of EDTA and 0.12 g hydrazine in one liter of 25% ammonium hydroxide solution; or a period of 2 h repeatedly for 30 times and then washing with deionized water; removing the teflon cap, drying, and then heating under nitrogen at 500° C. for 4 h, so that Pd—Ag metal alloy film is formed on the surface of the porous ceramic membrane.

31. A process as claimed in claim 14 wherein the deposition of palladium on the Pd-Ag metal alloy film is done by closing an end of the membrane tube by a teflon cap and then contacting metal alloy film with 10 ml aqueous solution, prepared by dissolving 4.0 g $PdCl_2$, 65 g disodium salt of EDTA and 0.12 g hydrazine in 1000 ml of 25% ammonium hydroxide solution, for a period of 2 h repeatedly for 3 times to form a thin film of Pd on the Pd-Ag alloy and then washing with deionized water.

32. A process as claimed in claim 14 wherein the surface oxidation of the Pd-metal film is effected by contacting it with a column of 30% $H_2O_2$ solution for 1 h repeatedly for 5 times, and then washing with deionized water and drying.

33. A process as claimed in claim 14 wherein the deposition of a hydrophobic polymer membrane on the surface oxidized Pd metal film is done by contacting the membrane with a column of non-aqueous polymer solution containing 2.0 wt % PVDF (Polyvinylidene fluoride) in DMF (didimethyl formamide) solvent for 30 minutes, removing the excess polymer solution and evaporating the solution leaving a thin film of the polymer on the inner surface of the membrane.

* * * * *